United States Patent Office 3,355,522
Patented Nov. 28, 1967

3,355,522
BICYCLIC THIOPHOSPHATE ESTERS OF O,O-DI-
ALKYL S-CARBOXYMETHYL PHOSPHATES
Rudi F. W. Rätz, Hamden, Conn., assignor to Olin Mathieson Chemical Corporation, New Haven, Conn., a corporation of Virginia
No Drawing. Filed Jan. 25, 1965, Ser. No. 427,912
7 Claims. (Cl. 260—927)

ABSTRACT OF THE DISCLOSURE

A series of bicyclic thiophosphates are provided in high yield and purity by the reaction of chloroacetate esters of 1-hydroxymethyl-4-phospha-3,5,8-trioxabicyclo[2.2.2]octane-4-sulfide with the alkali metal salts of O,O-dialkyl dithiophosphoric acids and O,O-dialkyl thiolphosphoric acids.

This invention relates to a series of bicyclic thiophosphates, and more particularly it relates to a series of bicyclic thiophosphate esters of O,O-dialkyl S-carboxymethyl phosphates having the following structural formula:

I
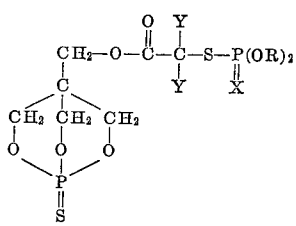

wherein X is selected from the class consisting of oxygen and sulfur, Y is hydrogen or chlorine, and R represents an alkyl moiety.

One of the intermediates utilized in the work described herein is 1-hydroxymethyl-4-phospha-3,5,8-trioxabicyclo[2.2.2]octane-4-sulfide which is prepared in accordance with the process described in my copending application Ser. No. 205,205, filed on June 26, 1962, now U.S. Patent No. 3,168,548, wherein pentaerythritol is reacted with thiophosphoryl chloride.

It has now been found that the chloroacetate esters of the aforementioned bicyclic alcohol can be reacted with the alkali metal salts of O,O-dialkyl dithiophosphoric acids and O,O-dialkyl thiolphosphoric acids to yield the thiophosphates (I) of this invention in high yield and purity. The reactions described herein proceed in accordance with the following equation wherein X, Y, and R are as previously represented.

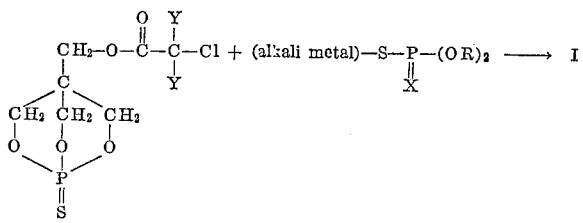

As used in the disclosure and claims herein, the term "chloroacetate esters" includes those esters which are prepared by reaction of 1-hydroxymethyl-4-phospha-3,5,8-trioxabicyclo[2.2.2]octane-4-sulfide with either chloroacetyl, dichloroacetyl or trichloroacetyl chloride. These chloroacetate ester reactants are conveniently prepared as described in Example 1 hereinafter.

The alkali metal salts of O,O-dialkyl dithiophosphoric acids and O,O-dialkyl thiolphosphoric acids wherein the alkyl groups are lower alkyl (1-4 carbon atoms) are preferred reactants in the practice of this invention since these particular acid-esters are commercially available. However, bicyclic thiophosphates having the Formula I wherein R is alkyl having up to 18 carbon atoms are also readily provided in accordance with this invention by the reaction of the appropriate alkali metal salts of the acid-esters with the chloroacetate esters. The higher members of the series of acid-esters are readily prepared by transesterification of lower members of the series. For instance, O,O-dimethyl or O,O-diethyl dithiophosphoric acid can be reacted with higher alcohols (containing up to 18 carbon atoms) in accordance with the method taught by S. Truchlik and J. Masek (Agrochem. Tech., Bratislava-Predmesti, Czech.) to provide higher alkyl dithiophosphoric acids. For example, if O,O-dimethyl dithiophosphoric acid is transesterified with n-octyl alcohol, the product O,O-dioctyl dithiophosphoric acid is obtained. Alkali metal salts of this acid-ester can then be conveniently reacted with the chloroacetate esters of the bicyclic alcohol to give thiophosphates (I) having two substituted octyl groups. Similarly lauryl alcohol and stearyl alcohol can be used in such transesterification procedures, and as a result, phosphorus-containing acid-esters having alkyl substituents with 12 and 18 carbon atoms are obtained in accordance with the described methods herein. Similar procedures can be used to provide higher O,O-dialkyl thiolphosphoric acids, the alkali metal salts of which can be used in the practice of this invention.

The preparation of the bicyclic thiophosphates (I) in accordance with this invention is conveniently carried out by mixing the chloroacetate esters with the aforementioned alkali metal salts at a reaction temperature range of 0° C. to about 180° C. After reaction is complete, the alkali metal chlorides are easily removed from the reaction mixture by washing or filtration procedures. The desired thiophosphate esters are then isolated by removing any solvents present and then utilizing conventional distillation and crystallization techniques.

Equimolar quantities of the chloroacetate esters and alkali metal salts should preferably be utilized in the process described herein. Excess molar amounts of either reactant may be used if desired for some reason, but there is no necessity for using such additional molar amounts in view of the rapidity with which nearly quantitative yields of the bicyclic thiophosphates (I) are obtained by using equimolar amounts of the reactants.

Although any of the alkali metals may be used to provide the required alkali metal salts, preferred alkali metal salts are the ammonium, potassium and sodium salts.

The reactants and bicyclic thiophosphate products are thermally stable up to a temperature of 180° C. Thus, the products can be provided by stirring the melted chloroacetate esters with the alkali metal salt reactants. However, a preferred process embodiment does involve the use of inert organic solvents during the reacting period. For instance, solvents such as acetone, alcohol, acetonitrile and the like are conveniently employed during the process of this invention. The use of such solvents also facilitates the removal of the inorganic salts resulting from the reaction process.

When the aforementioned solvents are utilized in the process of this invention, a reaction temperature range of about 0° C. to about 85° C. is preferably utilized. However, as shown in the following examples, excellent results have been obtained at room temperature, and therefore a preferred reaction temperature range is about 20°-40° C.

The bicyclic thiophosphates (I) are useful as corrosion inhibitors in lubricating oils, as flotation agents in the dressing of ores and as pesticides. In the latter area, they are valuable nematocides and fungicides particularly as foliage protectant fungicides against a range of fungus types including tomato early blight and cucumber anthracnose. Generally in these pesticidal applications, they are formulated with various adjuvants for convenient handling. For instance, they can be admixed with solid carriers to form active powders and dusts. They are also readily formulated in the form of emulsion concentrates suitable for dilution with water when admixed with appropriate organic solvents and emulsifying agents.

The following examples will serve to illustrate the novel compounds and process of this invention. These examples are illustrative only and are not to be considered as limiting the scope of this invention.

*Example 1*

In a 250 ml. round bottomed flask suitably protected from moisture was placed 78.4 g. (0.40 mole) of 1-hydroxymethyl - 4-phospha-3,5,8-trioxabicyclo[2.2.2]octane-4-sulfide and 86 g. (0.76 mole) of chloroacetyl chloride. The mixture was heated to 90° C. and at this temperature, evolution of hydrogen chloride began. The bath temperature was slowly raised to 130° C. and held for a period of four hours. The reaction mixture was allowed to cool to room temperature. The semi-crystalline product was placed on a Buchner funnel, and a brown oil of repugnant odor was removed. Final storage of the solid product on a clay plate gave 95.0 g. of ester (87% yield) in the form of gray crystals. A further small amount of an oily by-product was removed by washing the product in a beaker with 200 ml. of methanol (the ester is almost insoluble in methanol). After filtration, 82.0 g. of product was obtained, which was much lighter in color and also nearly odorless. This material was recrystallized from 400 ml. of o-dichlorobenzene, and 67.0 g. of colorless, odorless crystals melting at 142° C. were obtained. A second crop of 11 g. was recovered by storage of the mother-liquor in a refrigerator for several days. The following analytical data revealed that the desired 1-(chloroacetoxymethyl)-4-phospha - 3,5,8 - trioxabicyclo[2.2.2]octane-4-sulfide had been obtained.

*Analysis.*—Calcd. for $C_7H_{10}ClO_5PS$: C, 30.84; H, 3.70; Cl, 13.00; P, 11.36. Found: C, 30.38; H, 3.61; Cl, 13.6; P, 11.69.

In a similar manner, 1 - (dichloroacetoxymethyl) - 4-phospha-3,5,8-trioxabicyclo[2.2.2]octane-4-sulfide was obtained by the reaction of 1-hydroxymethyl-4-phospha-3,5,8-trioxabicyclo[2.2.2]octane-4-sulfide and dichloroacetyl chloride. The product crystallized from o-dichlorobenzene in the form of long shining needles melting at 164.5° C.

In a similar manner, 1 - (trichloroacetoxymethyl) - 4-phospha-3,5,8-trioxabicyclo[2.2.2]octane-4-sulfide was obtained by the reaction of 1-hydroxymethyl-4-phospha-3,5,8-trioxabicyclo[2.2.2]octane-4-sulfide and trichloroacetyl chloride. The product crystallized from o-dichlorobenzene in the form of colorless needles melting at 141°–142° C. On a preheated plate melting began to occur at 132° C. followed by solidification and final melting at 148° C. Analysis indicated that this melting behavior is due to solvation. When the product was recrystallized from benzene, solvation also occurred but by removing the benzene in vacuo for 30 minutes, the product melted at 148° C.

*Example 2*

The amount of 5.45 g. (0.02 mole) of 1-(chloroacetoxymethyl)-4-phospha-3,5,8-trioxabicyclo[2.2.2]octane-4-sulfide was dissolved in 20 ml. of acetone, and a solution of 3.5 g. of ammonium O,O-dimethyl phosphorodithioate in 80 ml. of the same solvent was added with stirring at room temperature at a fast rate. Separation of ammonium chloride started immediately. After standing overnight, the amount of 1.05 g. of salt was removed by suction filtration (calc. amount 1.07 g.).

Evaporation of the filtrate gave an almost colorless oil which crystallized immediately. Yield of the crude material amounted to 8.0 g. (approximately 100%). Recrystallization from 150 ml. of methanol resulted in 5.6 g. colorless plates, M.P. 119° C. The following analytical data revealed that O,O-dimethyl-S-[4-phospha-3,5,8-trioxabicyclo [2.2.2]octane - 4-sulfide(1-acetoxymethyl)]phosphorodithioate had been obtained.

*Analysis.*—Calcd. for $C_9H_{16}O_7P_2S_3$: C, 27.41; H, 4.09; P, 15.71; S, 24.39. Found: C, 27.30; H, 4.05; P, 15.27; S, 24.09.

*Example 3*

In the same fashion a solution of 4.2 g. of 1-(chloroacetoxymethyl) - 4-phospha-3,5,8-trioxabicyclo[2.2.2]octane-4-sulfide in 20 ml. of acetone was allowed to react with 3.14 g. of ammonium O,O-diethyl phosphorodithioate dissolved in 50 ml. of acetone. The amount of 0.8 g. of ammonium chloride was removed by filtration, and 7.0 g. of crystalline reaction product was recovered after solvent removal. Recrystallization from ethanol gave colorless shining plates, M.P. 86° C. The following analytical data revealed that O,O-diethyl-S-[4-phospha-3,5,8-trioxabicyclo [2.2.2]octane - 4-sulfide(1-acetoxymethyl)]phosphorodithioate had been obtained.

*Analysis.*—Calcd. for $C_{11}H_{20}O_7P_2S_3$: C, 31.35; H, 4.74; P, 14.69. Found: C, 31.43; H, 4.82; P, 14.42.

*Example 4*

A solution of 5.45 g. (0.02 mole) of 1-(chloroacetoxymethyl) - 4 - phospha-3,5,8-trioxabicyclo[2.2.2]octane-4-sulfide in 20 ml. of acetone was mixed with a solution of 5.04 g. of potassium O,O-di-isopropyl phosphorodithioate in 100 ml. of acetone. After standing overnight, the amount of 1.4 g. of potassium chloride was removed by filtration from the reaction mixture. Evaporation of the filtrate gave an almost colorless oil which crystallized within a short period. Yield: 8.8 g. Recrystallization from isopropanol resulted in colorless, shining plates, M.P. 116° C. The following analytical data revealed that O,O-diisopropyl - S - [4-phospha-3,5,8-trioxabicyclo[2.2.2]octane-4-sulfide(1-acetoxymethyl)]phosphorodithioate had been obtained.

*Analysis.*—Calcd. for $C_{13}H_{24}O_7P_2$: C, 34.65; H, 5.34; P, 13.75; S, 21.30. Found: C, 34.56; H, 5.46; P, 13.86; S, 22.03.

*Example 5*

To a solution of 3.74 g. of ammonium O,O-diethyl phosphorothiolate in 150 ml. of acetone, an acetone solution of 5.45 g. of 1-(chloroacetoxymethyl)-4-phospha-3,5, 8-trioxabicyclo[2.2.2]octane-4-sulfide was added at a fast rate. After standing overnight, the amount of 0.7 g. of ammonium chloride was removed by filtration. Evaporation of the yellowish filtrate in vacuo gave 10.4 g. of a clear yellow oil which did not show any tendency to crystallize even after treatment with suitable solvents. Therefore, the product was dissolved in 100 ml. of chloroform and the solution was washed twice with 40 ml. portions of water. After drying the chloroform solution over sodium sulfate, it was treated with charcoal, filtered, and the solvent was removed to provide a slightly straw-colored oil. The addition of 30 ml. of ethanol now induced crystallization. The crystals were filtered and recrystallized from ethanol to give a colorless product, M.P. 99°–100° C. The following analytical data revealed that O,O-diethyl-S - [4 - phospha-3,5,8-trioxabicyclo[2.2.2]octane-4-sulfide (1-acetoxymethyl)]phosphorothioate had been obtained.

*Analysis.*—Calcd. for $C_{11}H_{20}O_8P_2S_2$: C, 32.55; H, 4.94; P, 15.23; S, 15.75. Found: C, 33.08; H, 5.08; P, 14.24; S, 15.79.

What is claimed is:

1. Bicyclic thiophosphate esters having the formula

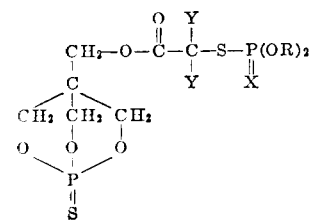

wherein X is selected from the class consisting of oxygen and sulfur, each Y is independently selected from the class consisting of hydrogen and chlorine, and R is alkyl having 1-18 carbon atoms.

2. Bicyclic thiophosphate esters having the formula

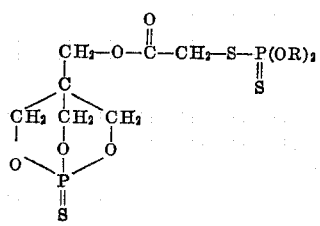

R being lower alkyl.

3. O,O - dimethyl-S-[4-phospha-3,5,8-trioxabicyclo[2.2.2]octane-4-sulfide(1-acetoxymethyl)]phosphorodithioate.

4. O,O - diethyl-S-[4-phospha-3,5,8-trioxabicyclo[2.2.2]octane-4-sulfide(1-acetoxymethyl)]phosphorodithioate.

5. O,O - diisopropyl-S-[4-phospha-3,5,8-trioxabicyclo[2.2.2]octane-4-sulfide(1 - acetoxymethyl)]phosphorodithioate.

6. Bicyclic thiophosphate esters having the formula

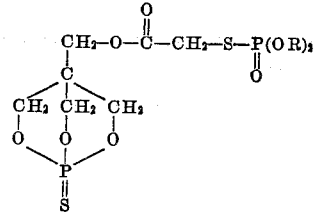

R being lower alkyl.

7. O,O - diethyl-S-[4-phospha-3,5,8-trioxabicyclo[2.2.2]octane-4-sulfide(1-acetoxymethyl)]phosphorothioate.

References Cited

UNITED STATES PATENTS

| 2,494,126 | 1/1950 | Hoegberg | 260—979 X |
| 2,494,283 | 1/1950 | Cassaday et al. | 260—979 X |
| 3,284,546 | 11/1966 | Fusco et al. | 260—979 X |

CHARLES B. PARKER, *Primary Examiner.*

A. H. SUTTO, *Assistant Examiner.*